July 16, 1929.  H. S. TAYLOR ET AL  1,720,864
HARVESTER AND REAPER THRASHER MACHINE
Filed Jan. 3, 1925   7 Sheets-Sheet 4

Fig. 5.

Inventors
H. S. Taylor
H. V. McKay

July 16, 1929. H. S. TAYLOR ET AL 1,720,864
HARVESTER AND REAPER THRASHER MACHINE
Filed Jan. 3, 1925   7 Sheets-Sheet 5

July 16, 1929.  H. S. TAYLOR ET AL  1,720,864
HARVESTER AND REAPER THRASHER MACHINE
Filed Jan. 3, 1925   7 Sheets-Sheet 7

Patented July 16, 1929.

1,720,864

UNITED STATES PATENT OFFICE.

HEADLIE SHIPARD TAYLOR AND HUGH VICTOR McKAY, OF SUNSHINE, VICTORIA, AUSTRALIA, ASSIGNORS TO H. V. McKAY PROPRIETARY LIMITED, OF SUNSHINE, VICTORIA, AUSTRALIA.

HARVESTER AND REAPER THRASHER MACHINE.

Application filed January 3, 1925, Serial No. 385, and in Australia January 14, 1924.

This invention relates to improvements in reaper thrasher and like harvester machines and refers especially, but is not limited, to such types of machines as are adapted to be propelled and operated by an engine mounted on the main frame.

The object of the present invention is to provide a reaper thrasher machine of wide cut and is directed principally to the construction and arrangement of the main frame, power transmission mechanism and operative parts and the employment therewith of a traction unit whereby power can be transmitted on the one hand to the power transmission mechanism to impart forward and reverse movements to the machine and on the other hand to the operative parts of the machine and whereby power can be utilized for either or both of the above mentioned purposes at the will of the operator.

We accomplish the abovementioned objects by providing a machine having a main frame furnished with a main beam or beams disposed longitudinally on the near side thereof with or without subsidiary longitudinal beams and front and rear diagonal beams connecting a forward and a rear part of the main beam or beams to a support for an offside traction wheel, a pair of steering wheels mounted on the rear end of the longitudinal beam or beams, a power unit on the near side of the main frame adapted to impart motion to a differential shaft coupled to a pair of combined transport and traction wheels and to a driving shaft operated by gearing from the opposite end of the crank shaft of the power unit to that coupled to the differential shaft, for transmitting motion to the operative parts of the machine.

A subsidiary frame carrying the reaping and conveying mechanism is pivotally supported on the front of the main frame and the thrashing and winnowing devices are mounted on the main frame.

In order that the invention, the object and nature of which have been set forth, may be clearly understood, reference will now be made to the accompanying sheets of explanatory drawings, in which:—

Figure 1 is a view in plan of a reaper thrasher machine embodying improvements comprised in the present invention.

Figure 5$^a$ is a view in perspective of a constructional detail which hereinafter will be fully described.

Figures 12, 13 and 14, are views in rear elevation, plan and side elevation, respectively, of means for mounting steering wheels on the rear of the main frame and for controlling the same.

Figures 3, 4:
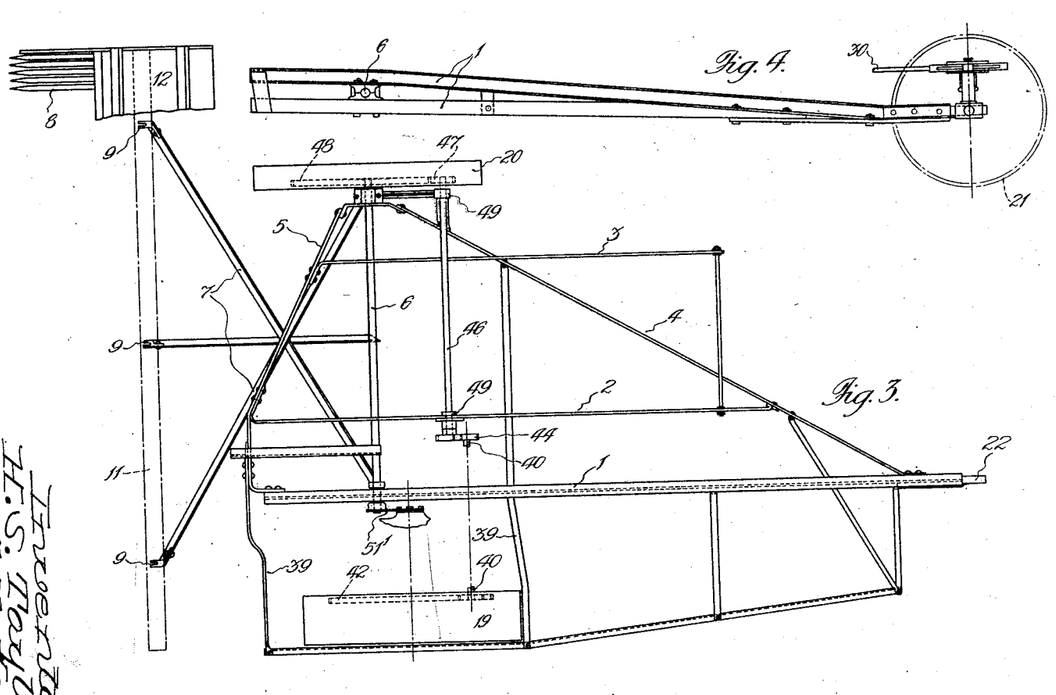
Figure 3 is a view in plan of the main frame and auxiliary frame of the machine.
Figure 4 is a view in side elevation of the near side longitudinal beam of the main frame of the machine.

In these drawings like characters of reference have been employed to indicate the same or corresponding parts in the different views and the numeral 1 designates a longitudinal member of substantial construction on the near side of the main frame and 2 and 3 are auxiliary longitudinal beams having their ends connected to diagonal beams 4 and 5 which are connected to the main longitudinal member and converge towards the offside of the machine. The main longitudinal member comprises a pair of beams one of which passes above and the other below a transverse axle 6 and these beams are trussed or stayed as indicated in Figure 4 to ensure rigidity of construction.

A vertically adjustable auxiliary frame 7 carrying a comb 8 and reaping mechanism is pivoted to the transverse axle 6 on the main frame. The pivoted comb carrying frame may comprise two diagonally disposed trussed beams which cross each other in advance of the transverse axle on the main frame and have their rear ends pivotally mounted on the said transverse axle.

A central longitudinal member having its rear end pivotally mounted on the transverse axle is rigidly connected at the point of intersection of the two diagonal beams and if preferred the pivoted frame may embody two outer longitudinal beams (not shown). The diagonal and longitudinal beams of the adjustable frame can be made of double or single pieces of angle iron or of beams of other approved shape in cross section and they can be interlaced or passed one over the other at their points of intersection where they are securely clamped or bolted together by approved devices.

The front ends of the diagonal and longitudinal beams of the adjustable frame terminate in transverse alignment and are fitted with jaws 9 which are pivotally connected to brackets 10 mounted on the underside of a beam 11 supporting a comb bar of the reaping and conveying mechanism.

The upper part of the casing 12 of the transverse conveyor is connected by a pair of rods or links 13 to arms 14 projecting upwardly from the main frame and transverse axle 6 and these rods or links ensure the comb 8 being maintained more or less horizontal when the vertically adjustable frame is raised and lowered to suit the height of crop being harvested.

Figure 10:
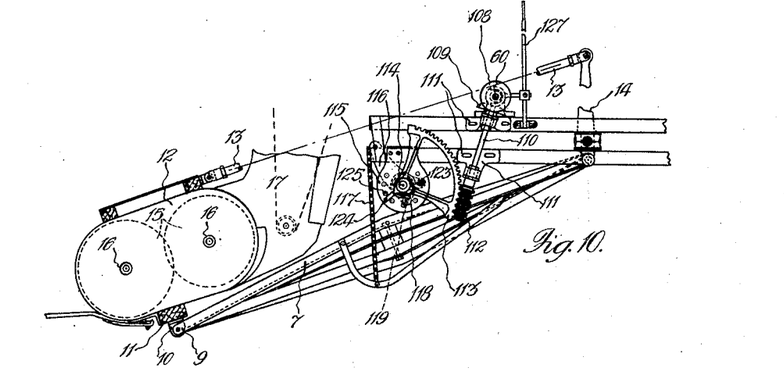
Figure 10 is a view in side elevation showing the auxiliary or pivoted frame of the machine and means for raising and lowering the same.
Figure 11:
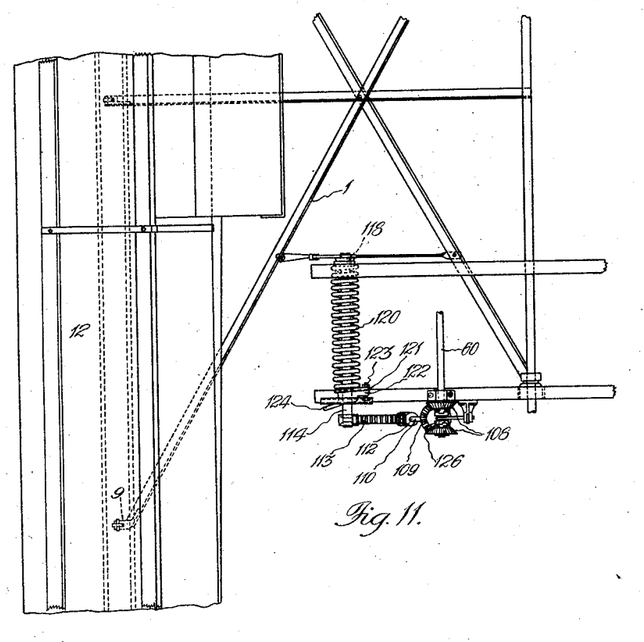
Figure 11 is a view in plan of Figure 10.
Figure 14:
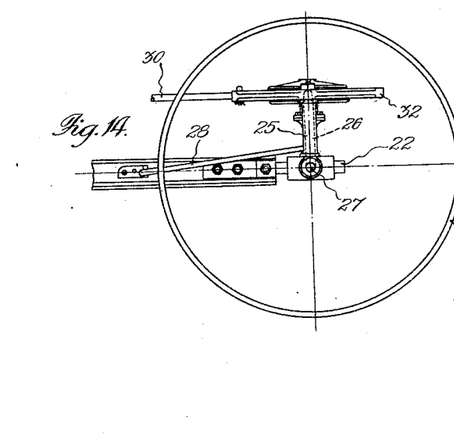
Figure 15:
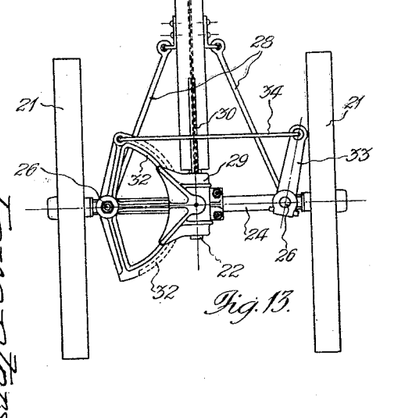
Figure 16:
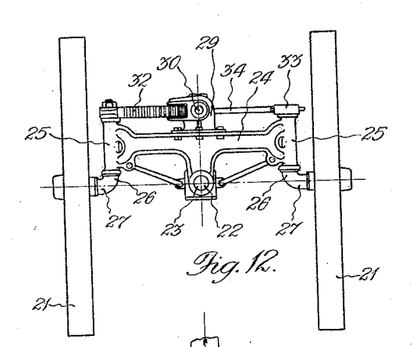

The transverse conveyor casing 12 is provided with two helical worm conveyors 15 arranged parallelly with each other and as indicated by dotted lines in Figure 10 of the drawings. The helical worm conveyors are mounted on spindles arranged to rotate in bearings 16 at the ends of the casing and the worms on the spindles at one side of the centre line of an elevator 17, delivering into a thrasher drum 18, are given a right hand turn or pitch and the worms on the opposite ends are given a left hand turn or pitch. The object in providing the spindles with worms of opposite pitch is to cause the material entering the front of the casing to be conveyed to the lower end of the elevator 17 from both ends of the said casing.

If preferred the transverse conveyors may consist of a rectangular flat casing having endless canvas conveyor aprons arranged to direct the straw and heads to the lower end of the elevator, or other known forms of transverse conveyors can be used.

The main frame is supported near its front end on a pair of traction wheels 19 and 20 and at its rear end on a pair of steering wheels 21.

The rear end of the longitudinal beam on the near side of the main frame terminates in or is fitted with a rearwardly extending pin or stud 22 which passes through a boss or hole 23 in the centre of a cross beam 24. The ends of the cross beam are formed with bosses 25 to take vertical posts 26 having their lower ends 27 cranked, upon which the steering wheels 21 are mounted.

The pivotal support for the cross beam enables both wheels 21 to bear upon the ground when they are passing over uneven surfaces and tie rods 28 are employed to connect the ends of the cross beam to the main frame whereby the said cross beam will be maintained at right angles thereto and the strains of the draught will be taken by the said tie rods.

A bearing 29 is mounted on the centre of the cross beam and this bearing is adapted to support a rod 30 having a worm, not shown, which meshes with a toothed sector 32 fitted to the upper end of one of the vertical posts. An arm 33 on the second vertical post is connected by a link 34 to a forward part of the toothed sector whereby when the worm is rotated the steering wheels will be turned in unison.

The rod 30 carrying the worm is connected by a universal joint 35 to the column 36 of a hand steering wheel 37 located within convenient reach of the driver of the machine.

A power unit 38 preferably of the internal combustion type of engine is located on the near side of the main frame. The frame of the engine can be partially supported on a subsidiary frame 39 projecting laterally from the main longitudinal beams and this subsidiary frame can be strengthened by suitable stays or tie bars connected to the main frame of the machine.

The rear end of the crank shaft of the engine drives through change speed gearing and clutch mechanism in the ordinary way to differential gearing on a cross shaft from which motion can be imparted to the traction wheels.

In one instance, the near side end of a differential shaft 40 is fitted with a pinion 41 which meshes with a circular internal toothed rack 42 on the near side traction wheel 19 mounted on a fixed axle 43 which is supported by the frame of the engine and by the subsidiary frame partially supporting the same.

The opposite end of the differential shaft 40 is fitted with a pinion 44 which meshes with a gear wheel 45 on a transverse shaft 46 having a pinion 47 on its off side end meshing with an external toothed circular rack 48 on the offside traction wheel. The transverse shaft is mounted in bearings 49 on the main frame and the differential shaft and gearing can be housed in a stout casing 50 provided with anti-frictional bearings and forming part of or connected to the engine frame. The axle 6 of the offside traction wheel 20 passes beneath the main frame and forms a rigid transverse support for the said frame and to this axle is pivoted the vertically adjustable frame carrying the stripping or reaping mechanism of the machine. The near side end of the axle 6 is supported in a bearing carried by a bracket 51' which is bolted to the frame of the engine.

The front end of the crank shaft of the power unit is fitted with a bevel pinion 52 which meshes with a bevel wheel 53 on a cross shaft 54 mounted in bearings on the main frame or on the frame of the engine.

The cross shaft 54 is operatively connected to a collinear drive shaft 55 which is provided with a power transmission clutch 56 operated by a control lever (not shown). The cross shaft is connected to the drive shaft 55 by a flexible coupling 57 whereby smooth running is ensured when the said cross shaft and the drive shaft 55 are slightly out of alignment through wear or from other causes. Wherever practicable a single shaft can be used in lieu of a flexibly coupled cross shaft and drive shaft.

A pinion 58 is fitted to the drive shaft 55 and gears with a spur wheel 59 carried on a transversely disposed counter shaft 60 mounted in bearings on the main frame. The spur wheel 59 on the counter shaft meshes with a pinion 61 on the spindle 62 of the thrasher drum 18.

Thus, it will be understood that, by throwing the clutch out of action, the machine can be transported from place to place without imparting motion to the operative parts thereof. When the machine is working in a crop, the members of the clutch are in their engaged positions and motion is imparted to the traction wheels and to the operative parts of the machine. The forward and reverse movements of the drive of the engine are controlled by change speed gearing in any approved and well known way.

If preferred, any other form of gearing can be used for transmitting motion from the drive shaft to the countershaft and spindle of the thrasher drum.

The countershaft may be supported at its inner end in a self-centering bearing 100 and between the spur wheel 59 and the said bearing is fitted a bevel pinion 101 which meshes with a bevel pinion 102 on a longitudinal shaft 103 having its forward end passing through a bearing 104 formed integrally with the self-centering bearing.

The rear end of the longitudinal shaft 103 is fitted with a crank 105 for imparting an oscillating movement to a winnower 106 located at the rear of the thrasher drum 18 and which is supported from the frame 107 of a superposed straw walker in any approved way.

The bearings supporting the countershaft are adapted to be adjusted by means of slots 100' and set screws 100'' to cause the spur wheel 59 to mesh correctly with the pinions 61 and 58 on the thrasher spindle and on the drive shaft, respectively.

The outer end of the counter shaft 60 is fitted with two oppositely disposed bevel pinions 108 having clutch teeth on their inner faces. A bevel pinion 109 is mounted on a spindle 110 carried in brackets 111 and the lower end of the spindle is provided with a worm 112 which meshes with a worm wheel or sector 113 attached to a transverse shaft 114 carried in brackets 115 depending from the main frame of the machine.

The shaft 114 supported in the depending brackets 115 is provided on the inner end with an upwardly projecting curved arm 116 or sector having a curved front face.

A flexible member 117 is connected to the free end of the arm 116 and passes around the curved face thereon, and is connected at its opposite end to a diagonal beam 7 of the vertically adjustable frame carrying the reaping mechanism or to a part attached thereto.

The curved arm 116 is provided with an inwardly projecting stud 118 which is engaged by a loop 119 on one end of a torsional spring 120 carried on the shaft 114 between the depending brackets 115. The opposite end of the spring 120 is attached to a stud 121 projecting inwardly from an arm or lug on a collar 122 which is rotataively supported near the adjacent bracket and adjustably locked thereto by a pin 123.

The collar 122 when disconnected from the bracket may be rotated on the transverse shaft 114 and is formed with an arm 124 adapted to take a piece of tubing or a lever to enable the tension of the torsional spring to be taken up as desired and the tension may be maintained by inserting the pin 123 in one of a series of holes 125 in the adjacent supporting bracket to lock the collar in its adjusted position.

A sliding clutch member 126 is mounted on the countershaft between the oppositely disposed bevel pinions 108 and this clutch member is adapted to be placed in engagement with the clutch teeth on one or other of the bevel pinions by means of a lever 127 disposed within convenient reach of the driver of the machine.

The offside of the vertically adjustable frame can be connected to the main frame by means of a suitable counterbalance spring or springs (not shown) to assist in the raising of the said adjustable frame.

When it is desired to raise or lower the adjustable frame, the driver operates the clutch lever 127 to place the clutch member 126 into engagement with one or other of the bevel pinions 108 so that the rotation of the countershaft will cause the spindle 110 carrying the worm to rotate and impart the desired movement to the transverse shaft 114 carrying the curved arm or spiral sector.

The disposition of the curved arm 116, and the connections between the said arm and the adjustable frame is such that, as the frame is lowered, a greater leverage is obtained on the spring 120 to compensate for the increased tension placed on the same. The increase or decrease in the tension of the spring 120, as the adjustable frame is lowered or raised, is more or less in conformity with the increase or decrease of leverage obtained with the changes in the position of the curved arm. Thus the lifting strain on the movable frame is more or less constant and permits of the said frame being raised and lowered with ease.

The countershaft 60 is fitted with a pinion 128 which is adapted to mesh with a pinion 129 carried on a short spindle 130 mounted on the main frame and the said spindle is fitted with a sprocket 131 adapted to drive a chain 132 and sprocket 133 for imparting movement to a spindle 134 passing through the upper end of a grain elevator 135 and through the upper end of a headings elevator 136.

The clean grain gravitates from the front end of the winnower 106 to the boot 137 of the clean grain elevator and the headings gravitate from the rear end of the winnower to the boot 138 of the headings elevator.

The inner end of the spindle 134 passing through the upper ends of the elevators is fitted with a pulley 139 adapted to carry a belt 140 which passes around a pulley 141 on the projecting end of a crank shaft 142 carrying the rear ends of the straw walkers. The straw walkers are constructed and supported in any well known way and receive their motion through the medium of the crank shaft and belt and pulley gearing above described.

The spindle 62 of the thrasher extends beyond the ends of the drum and through fan casings 143 formed concentrically on the ends thereof. Those portions of the spindle which lie within the fan casings are provided with fan blades 62' and the throats of both fans unite at the rear of the thrasher and direct a draught of air to the open front end of the winnower, as shown by dotted lines at 143' in Figure 1 of the drawings.

A feed roller 63' (shown in dotted lines in Figures 1 and 2) is located above the mouth of the thrasher drum 18 and this feed roller, together with a driving spindle 144 and an elevator 17 for delivering the grain and straw from the transverse conveyor 15 is driven by a chain and sprockets 146 from a sprocket 147 on the countershaft. The sprocket chain passes from the sprocket on the elevator spindle 144 to and over the sprocket on the feed roller, around a tensioning sprocket 148 adjustably fitted to the main frame of the machine and over the top of the sprocket 147 on the countershaft.

The arrangement of the gearing for imparting motion to the elevator spindle 144 and feed roller may be varied to suit modifications in the gearing for transmitting motion to or from the countershaft.

Figure 5:
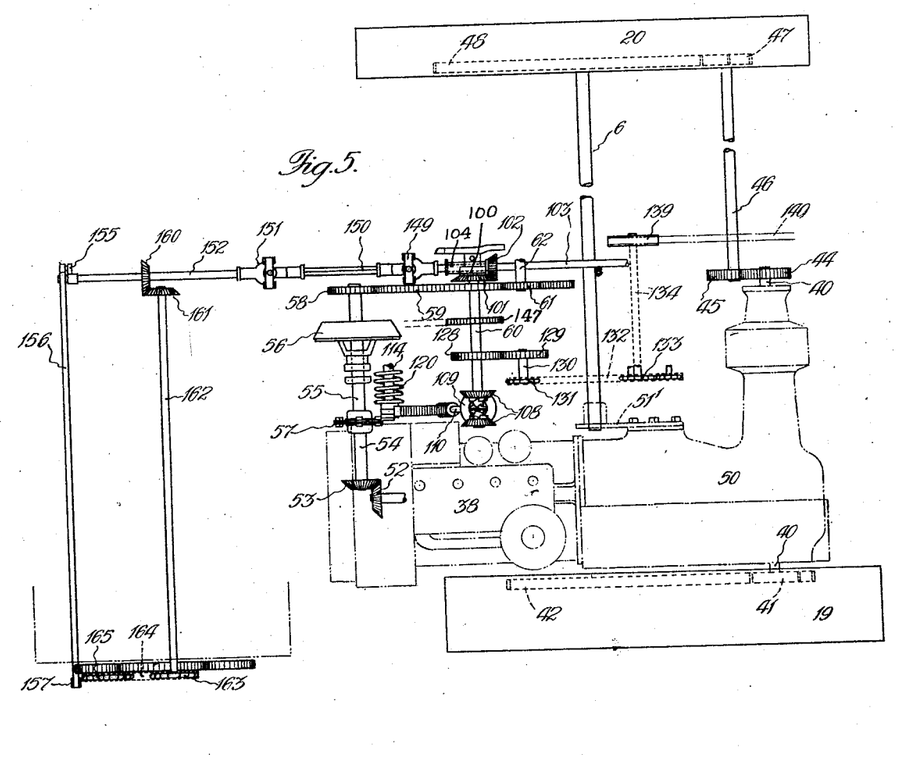
Figure 5 is a view in plan illustrating the mechanism for transmitting motion from the power unit to the operative parts of the machine.
Figures 6, 7, 8, 9:
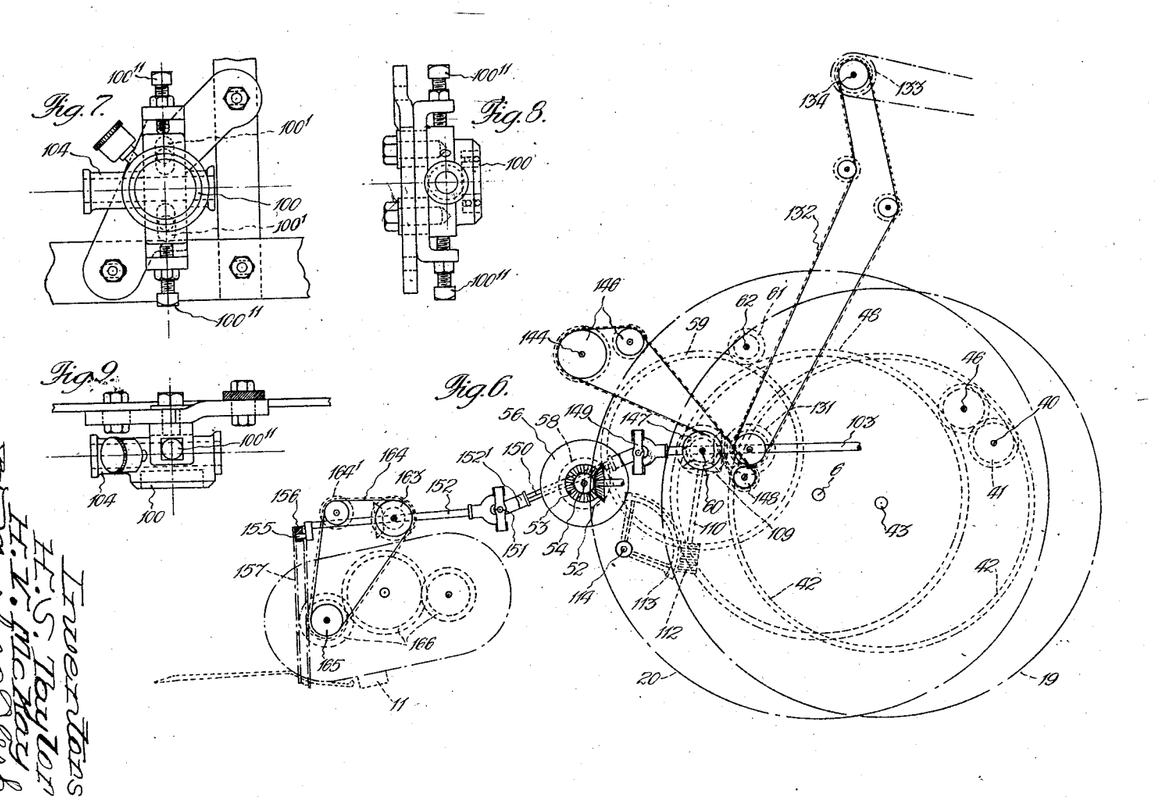
Figure 6 is a view in side elevation illustrating mechanism for imparting motion to operative parts of the machine.
Figures 7, 8 and 9 are views in side elevation, front elevation and plan, respectively, of an adjustable bearing for supporting a shaft and hereinafter will be fully described.

The front end of the shaft 103 carrying the crank 105 for imparting an oscillating movement to the winnower 106 is connected by a universal joint 149 to a shaft 150 which passes forwardly and is connected by a second universal joint 151 to a short spindle 152 which is mounted rotatively in bearings 153 on a bracket 154 supported above the casing of the transverse conveyor. One end of the shaft 150 is fitted telescopically within a sleeve 152' on the universal joint 151 in order to permit of end movement of the said spindle when the adjustable frame is raised and lowered, see Figs. 1, 5 and 6.

The spindle 152 passing through the bearings on the top of the casing of the transverse conveyor is provided at its front end with a crank 155 which is connected to one end of a pitman 156 having its opposite end connected to a sway bar 157 pivotally mounted on the near end of the said casing.

Figure 2:
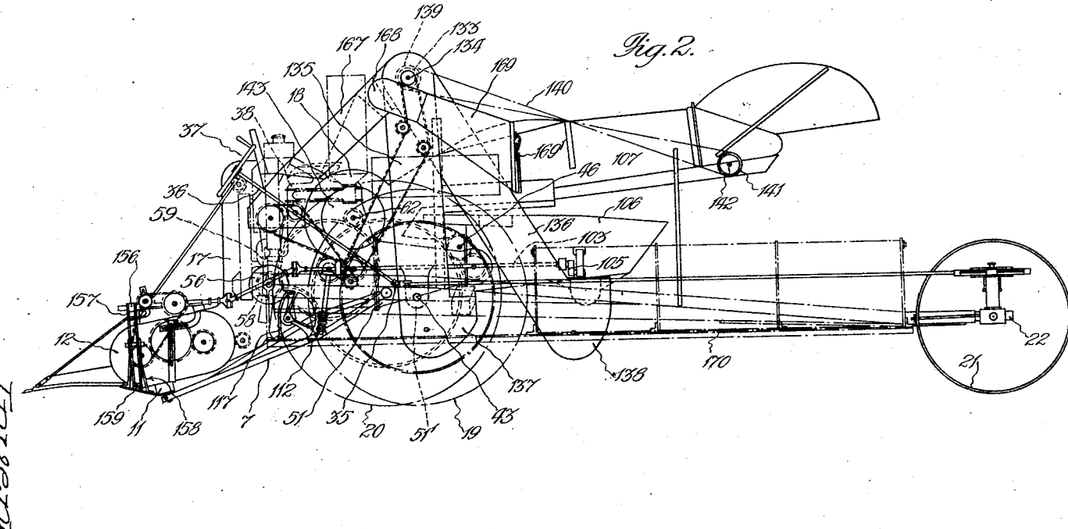
Figure 2 is a view in side elevation of the machine shown in Figure 1.

The sway bar 157 is pivoted at 157' to a bracket 158 on the near side of the conveyor casing and its lower end is connected, and is adapted to impart a reciprocating motion to a knife bar 159 disposed transversely at the rear of the comb in the ordinary way, see Figure 2.

A bevel pinion 160 is mounted on the short spindle 152 carried by the brackets on the top of the conveyor casing and this pinion meshes with a bevel pinion 161 fitted to the end of a transverse shaft 162 carried in bearings on the said conveyor casing.

The near end of the said shaft 162 is fitted with a sprocket wheel 163 which is connected by a chain 164 to a sprocket wheel 165 on the projecting end of the spindle carrying the front helical conveyor. The chain 164 passes over a sprocket 164' which is adapted to be adjusted to alter the tension of said chain, as required.

The rear helical conveyor is driven from the spindle of the front helical conveyor by means of toothed gearing 166 and this gearing is arranged to impart rotation to the rear conveyor in the same direction as that given to the front helical conveyor.

Figures 1, 5A:
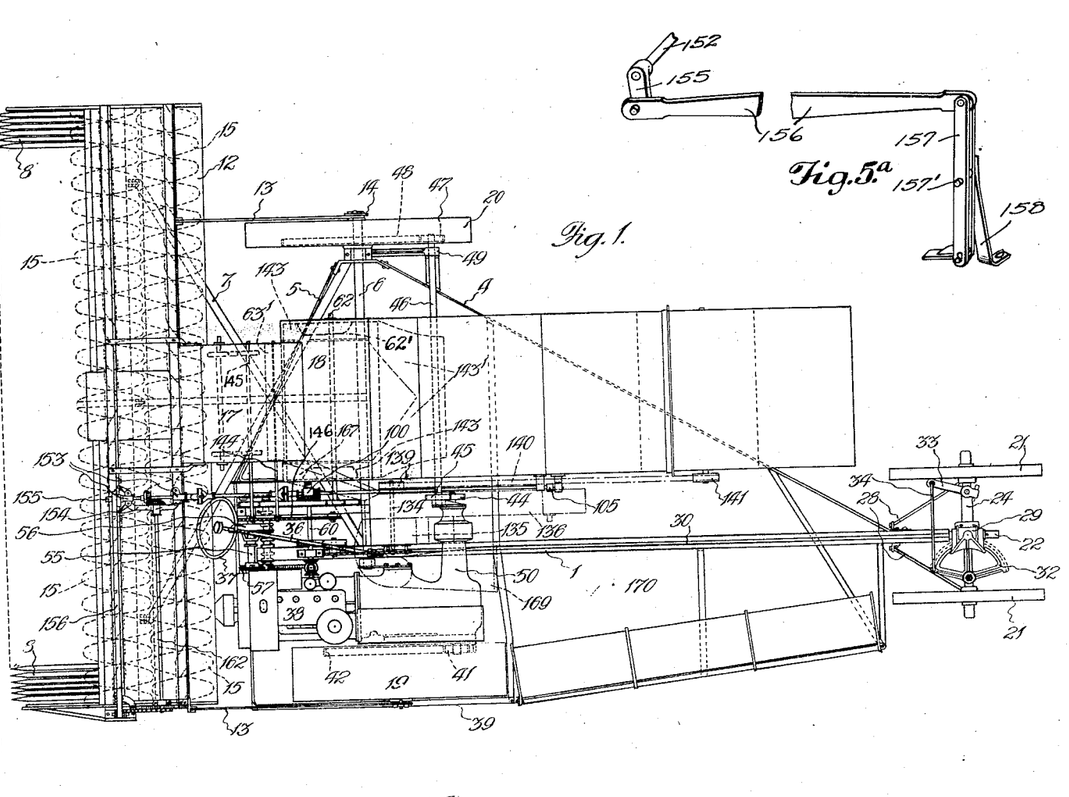

The upper end of the headings elevator 136 is fitted with a chute 167 which is adapted to deliver the partially thrashed heads to the thrasher drum for re-treatment, see Figs. 1 and 2.

The upper end of the grain elevator discharges into a short chute 168 leading to a hopper 169 having one or more outlet openings provided with sliding doors 169' beneath which are located suitably constructed bag holding devices (not shown). These bag holding devices can be of any known construction and are located over a platform 170 supported on the near side of the machine upon which a man may stand to control the filling of the bags.

The front of the main frame of the harvester or reaper thrasher can be designed so as to enable horse traction to be applied when found necessary or desirable but such alterations as may be required will not affect the novel operative features of the invention so far as they relate particularly to such machines. When horses are employed to draw the machine, a light power unit may be used in any well known way to transmit motion through the drive shaft 55 or countershaft 60 to the operative parts only of the machine.

We claim:

1. In machines of the class described, a main frame having an engine mounted thereon, a differential shaft driven from the engine, a thrasher drum and winnower mounted on the main frame, a frame adjustably supported on the front of the main frame, means for raising and lowering the adjustable frame, crop gathering and conveying mechanism mounted on the adjustable frame, an elevator for delivering grain and straw from the crop gathering and conveying mechanism to the thrasher, traction wheels on the front of the main frame, circular racks on the traction wheels pinions fitted to the differential shaft and meshing with the racks, a transversely disposed drive shaft on the main frame, gearing for imparting motion to the drive shaft from the engine, and gearing on the said drive shaft for imparting motion to the operative parts of the machine.

2. In machines of the class described, a main frame having an engine mounted thereon, a differential shaft driven from the engine, a thrasher drum and winnower mounted on the main frame, a frame adjustably supported on the front of the main frame, crop gathering and conveying mechanism supported by the adjustable frame, an elevator for delivering grain and straw from the crop gathering and conveying mechanism to the thrasher, traction wheels on the main frame, circular racks on the traction wheels, pinions meshing with the racks and driven from the differential shaft of the engine, steering wheels on the main frame, a drive shaft adapted to be operated by gearing from the engine, a pinion on the drive shaft, a power transmission clutch adapted to place the pinion in fixed relationship with the drive shaft, and gearing adapted to receive its motion from the pinion on the drive shaft for imparting motion to the operative parts of the machine.

3. In reaper thrasher and harvesting machines, a main frame having an engine mounted thereon furnished with a gear box and differential shaft, a pivotally supported frame on the front of the main frame carrying crop gathering and conveying mechanism, a thrasher drum and winnower mounted on the main frame, an elevator for delivering grain and straw from the crop gathering and conveying mechanism to the thrasher, main traction wheels having circular racks thereon, pinions meshing with the racks and driven from the differential shaft of the engine, a main longitudinal beam on the near side of the main frame, steering wheels supported at the rear of the main longitudinal beam, a transverse drive shaft driven by gearing from the engine, a pinion on the drive shaft, a clutch adapted to place the pinion in fixed relationship with the drive shaft, and gearing operated from the pinion for imparting motion to the operative parts of the machine.

4. In machines of the class described, a main frame supported at its front end on traction wheels, and at its rear end on steering wheels, an engine mounted on the main frame, circular racks on the traction wheels, a differential shaft driven from the engine, pinions meshing with the racks and driven from the differential shaft, a drive shaft on the main frame, gearing operatively connecting the drive shaft to the crank shaft of the engine, a pinion on the drive shaft, a clutch adapted to operatively connect the pinion to the drive shaft, a counter shaft having a spur wheel meshing with the driving pinion, a thrasher drum on the main frame, a free wheel clutch pinion on the spindle of the thrasher meshing with the spur wheel, a winnower on the main frame, and gearing for operating the winnower from the counter shaft.

5. In machines of the class described, the combination with the subject matter of claim 4, of a pinion on the counter shaft, a short spindle mounted transversely on the main frame, a pinion on the short spindle meshing with a pinion on the counter shaft, a sprocket wheel on the short spindle, a hopper on the main frame, elevators for delivering clean grain from the winnower to the hopper and for delivering the headings from the winnower to the thrasher, endless chain and sprocket gearing driven by the sprocket on the short spindle for imparting motion to the elevators, straw walkers above the winnower, and belt and pulley gearing for imparting motion from the elevators to the straw walkers.

6. In machines of the class described, the combination with the subject matter of claim 4, of a sprocket on the counter shaft, a feed roller mounted above the mouth of the thrasher drum, cheeks on the thrasher drum, a spindle mounted in the cheeks on the thrasher drum and passing through the elevator throat for delivering material from the transverse conveyor casing to the thrasher, sprockets on the spindle for imparting motion to the endless chains of the elevator, sprockets on the feed roller and spindle, a tensioning sprocket on the main frame, and an endless chain passing over the sprocket on the counter shaft around the tensioning sprocket, and around the sprockets on the feed roller and on the spindle passing through the forward part of the cheeks on the drum casing.

7. In machines of the class described, a main frame supported at its front end on traction wheels and at its rear end on steering wheels, an engine mounted on the near side of a main frame, a differential shaft driven from the engine, circular racks on the traction wheels, pinions on the differential shaft and meshing with the racks, a drive shaft on the front of the main frame, gearing for imparting motion to the drive shaft from the crank shaft of the engine, a pinion on the drive shaft, a clutch member for releasably connecting the pinion to the drive shaft, a counter shaft, a spur wheel on the counter shaft meshing with the pinion, a thrasher drum on the main frame, a pinion on the spindle of the thrasher meshing with the spur wheel, a winnower on the main frame, clean grain and headings elevators for the winnower, gearing for operating the winnower and elevators from the counter-shaft, a frame pivoted to and projecting forwardly from the main frame, crop gathering mechanism on the pivoted frame, an elevator fitted to the crop gathering mechanism and adapted to deliver grain and straw to the thrasher, and gearing operated from the counter shaft for imparting motion to the operative parts of the crop gathering mechanism and elevator.

8. In machines of the class described having a main frame furnished with an engine for transmitting motion to traction wheels supporting the front of the frame and to the operative parts of the machine, a counter shaft driven by gearing from the engine, oppositely disposed bevel wheels on the counter shaft, a spindle supported in bearings on the main frame, a bevel wheel fitted to the spindle and meshing with the bevel pinions on the counter shaft, a worm on the spindle, a shaft mounted on the main frame, a sector on the shaft and meshing with the worm wheel on the spindle, an arm fitted to the said shaft, an adjustable frame carrying crop gathering mechanism, a connection between the arm and the adjustable frame, a torsional spring exerting an upward pressure on the arm, and a member adapted to be adjusted to place a greater or lesser tension on the said torsional spring.

9. In machines of the class described, a main frame having thrashing mechanism thereon, an adjustable frame projecting forwardly from the main frame, a conveyor casing mounted transversely on the front of the adjustable frame, a pair of opposed helical conveyors in the front part of the conveyor casing and above the base of the comb, a second pair of opposed helical conveyors within the casing at the rear of the first mentioned pair of opposed helical conveyors, said opposed pairs of conveyors being adapted to move the grain and crop towards the centre of the casing, an opening in the back of the conveyor casing in line with the adjacent ends of the helical conveyors, and an elevator passing from the said opening and adapted to deliver the grain and crop to the thrashing mechanism.

10. In machines of the class described, a main frame having a thrasher and winnower mounted thereon, traction wheels on the front and steering wheels on the rear of the main frame, an adjustable frame having its rear end pivotally supported on the main frame, crop gathering mechanism on the front end of the adjustable frame, an elevator adapted to deliver grain and straw to the thrasher from the crop gathering mechanism, means for adjustably supporting the front end of the adjustable frame from the main frame, an engine having a crank shaft, change speed gearing, a differential shaft adapted to receive its motion through the change speed gearing from the crank shaft, means for imparting motion from the differential shaft to the traction wheels, a drive shaft driven from the crank shaft of the engine, gearing operated from the drive shaft for imparting motion to the operative parts of the machine, and means for throwing the operative parts into and out of action whereby the engine can be employed to propel the machine with or without simultaneously imparting motion to the operative parts thereof.

11. In machines of the class described, a main frame, an adjustable frame having its rear end pivotally supported on the main frame and carrying crop gathering mechanism on the front end thereof, means for adjustably supporting the front end of the adjustable frame from the main frame of the machine, comprising a short transverse spindle rotatively mounted on the main frame, a toothed sector fitted to one end of the spindle, a rotatively mounted spindle, a worm on the rotatively mounted spindle meshing with the sector, an arm on the opposite end of the spindle, a member connecting the free end of the arm to the adjustable frame, a spring exerting an upward pressure on the arm, means for adjusting the tension of the spring, and means for rotating the spindle carrying the worm to operate the sector to raise and lower the front end of the adjustable frame.

12. In machines of the class described, a main frame, an adjustable frame having its main frame, an adjustable frame having its rear end pivotally supported on the main frame and carrying crop gathering mechanism on the front end thereof, means for adjustably supporting the front end of the adjustable frame from the main frame of the machine, comprising a short transverse spindle rotatively mounted on the main frame, a toothed sector fitted to one end of the spindle, a rotatively mounted spindle, a worm on the rotatively mounted spindle meshing with the sector, an arm on the transverse spindle, a member connecting the arm to the adjustable frame, a torsional spring surrounding the transversely mounted spindle and having one end connected to the said arm, a rotatively adjustable member connected to the opposite end of the spring, means for retaining the rotatively adjustable member in position to maintain a desired tension on the said spring, and means for rotating the spindle carrying the worm to operate the sector to raise and lower the front end of the adjustable frame.

13. In machines of the class described, the combination with the subject matter of claim 12, of a pair of oppositely disposed bevel pinions on the counter shaft, a sliding clutch member located between the pinions and adapted to place one or other of the said pinions in fixed relationship with the counter shaft, and a bevel wheel mounted on the spindle carrying the worm and meshing with the bevel pinions on the counter shaft.

14. In machines of the class described, a main frame having a thrasher drum mounted thereon, an adjustable frame having its rear end pivotally supported on the main frame, a conveyor casing mounted transversely on the front end of the adjustable frame, a comb bar mounted beneath the casing and provided with a forwardly projecting comb, a knife reciprocating transversely at the base of the comb, a pair of opposed helical conveyors in the front part of the conveyor casing and above the base of the comb, a second pair of opposed helical conveyors within the casing at the rear of the first mentioned pair of opposed helical conveyors, said opposed pairs of conveyors being adapted to move the grain and crop towards the centre of the casing, an opening in the centre of the back of the casing, an elevator passing from the opening in the back of the conveyor casing to the thrasher drum, and bearings in the ends of the casing of the spindles of the helical conveyors.

15. In machines of the class described, the combination with the subject matter of claim 14, of pinions on the ends of the spindles of the helical conveyors, an intermediately disposed gear wheel meshing with the pinions on the helical conveyors, a sprocket on one of the spindles, a rotatively mounted shaft disposed transversely above the conveyor casing, a sprocket fitted to the rotatively mounted shaft, an endless chain passing over the sprocket on the conveyor spindle and over the sprocket on the shaft, and means for maintaining the desired tension on the endless chain.

16. In machines of the class described, the combination with the subject matter of claim 15, of a bevel pinion on the transverse shaft, a longitudinal shaft rotatively supported in bearings on the casing, a bevel pinion on the longitudinal shaft meshing with the bevel pinion on the transverse shaft, a crank on the forward end of the longitudinal shaft, a sway beam operatively connected to the knife, a pitman connecting the crank to the sway beam, and means for imparting rotation to the longitudinal shaft.

17. In machines of the class described, a main frame having a thrasher and winnower mounted thereon, an adjustable frame having its rear end pivotally supported on the main frame and carrying crop gathering mechanism on its front end, an elevator adapted to deliver grain and straw to the thrasher from the crop gathering mechanism, a drive shaft disposed transversely on the main frame, a pinion on the drive shaft, clutch mechanism for throwing the drive shaft into and out of action, a counter shaft, a spur wheel mounted on the counter shaft and meshing with the pinion on the drive shaft, a free wheel clutch pinion on the spindle of the thrasher meshing with the spur wheel, a bevel pinion on the counter shaft, a shaft disposed longitudinally on the main frame, a bevel pinion on the longitudinal shaft meshing with the bevel pinion on the counter shaft, a crank on the rear end of the longitudinal shaft for imparting motion to the winnower, an extensible shaft, a universal coupling connecting the extensible shaft to the front end of the longitudinal shaft, a shaft disposed longitudinally above the crop gathering mechanism, a universal coupling connecting the extensible shaft to the shaft disposed longitudinally above the crop gathering mechanism, and means operated from the last mentioned longitudinal shaft for imparting motion to the operative members of the crop gathering mechanism.

In testimony whereof they have affixed their signatures.

HEADLIE SHIPARD TAYLOR.
HUGH VICTOR McKAY.